Patented Apr. 4, 1950

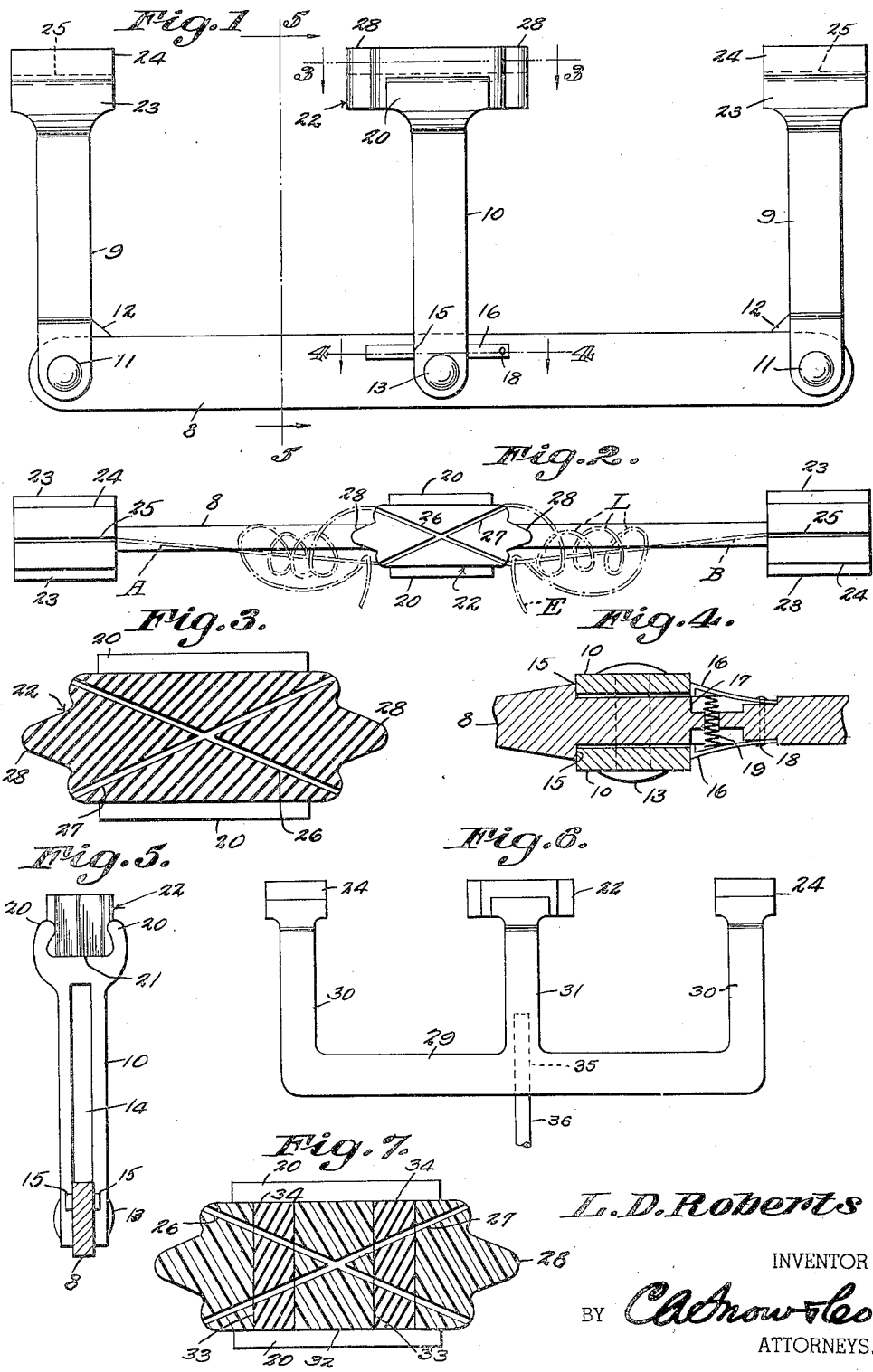

2,502,751

UNITED STATES PATENT OFFICE 2,502,751

FISHING LEADER VISE

Lawrence David Roberts, Mount Vernon, N. Y.

Application July 9, 1948, Serial No. 37,861

5 Claims. (Cl. 289—17)

This invention relates to a fishing leader vise, and more particularly, relates to a device adapted to hold two strands of a fishing leader in a manner to permit their being knotted together with facility.

By way of background, it may be noted that the knot most favored in making or repairing fishing leaders of such material as nylon or natural silk worm gut, is the blood knot. This knot, is, in fact, generally used by all manufacturers of fishing leaders. The knot is very difficult to tie, and it has heretofore been the case that one tying the knot be possessed of good eyesight and considerable dexterity, if a good blood knot is to be tied, and in a minimum of time.

The main purpose of the present invention, in this connection, is to provide a device as generally set forth above that will retain the separate strands to be knotted in such relative positions as to permit the tying of the blood knot desired, with ease and facility.

A further important object is to provide a device as stated that is simple in construction, will occupy a small space, and is readily adapted for folding. Thus, the device can be carried in the pocket, or can occupy an inconspicuous place in fishing equipment, thus to permit blood knots to be tied speedily and easily when a leader is broken during a fishing trip.

To this end, the invention embodies a supporting frame which includes a base, an upstanding end arm at each end of the base, an upstanding middle arm at the center of the base, strand holders on the end arms each having a longitudinal groove, and a middle strand holder on the medial arm having crossed grooves.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a side elevational view of one form of fishing leader vise constructed in accordance with the invention.

Figure 2 is a top plan view, the dotted lines indicating strands of a fishing leader that are to be joined by a blood knot.

Figure 3 is an enlarged section on line 3—3 of Fig. 1.

Figure 4 is an enlarged section on line 4—4 of Fig. 1.

Figure 5 is a section on line 5—5 of Fig. 1.

Figure 6 is a side elevational view of another form of the device.

Figure 7 is a section, cut in the same plane as the section 3—3 through a modified form of strand holder.

Referring to the drawings in detail, a supporting frame comprises an elongated base 8 supporting upstanding end arms 9 and an upstanding medial arm 10. In the collapsible frame illustrated in Fig. 1, the end arms 9 are pivotally connected at 11 to the base 8, so as to permit them to be swung from their upright positions shown into an inoperative position wherein they will lie longitudinally of the base. When brought to upright positions as shown, they come against stops 12 rigid with the base 8.

The medial arm 10 is also pivotally connected to the base 8, as shown at 13, and as to this connection, it is preferred that a positive lock be provided for holding the arm 10 upright. Many forms of locking arrangements could undoubtedly be employed for this purpose, and as an example of one such arrangement, I show a construction wherein the medial arm 10 is slotted upwardly for most of its length as shown at 14 (Fig. 5), the spaced arms defined by the slot embracing the base 8 for passage of the pivotal connection 13 therethrough. The base 8 can be formed with stops or shoulders 15 at opposite sides of the base, for limiting movement of the arm 10 in one direction. Movement of arm 10 in the other direction is prevented by outpressed leaf springs 16 (Fig. 4), which can move into recesses 17 of the base 8, and which are connected at one end to the base as at 18. The coil spring 19 presses the leaf springs 16 away from each other, and thus the medial arm 10 is locked in an upright position. When it is desired to collapse the arm 10 against the base 8, it is only necessary that one press the springs 16 toward each other, so as to move them into the recesses 17, whereupon the arm 10 can be swung downwardly. The arm when collapsed will of course hold the springs 16 in their respective recesses.

Carried at the free ends of the end arms 9 and medial arm 10 are strand holders, which I believe can be secured to the arms in any of various ways. In the present instance, arm 10, for example, has at its free end yoke arms 20 (Fig. 5), cooperating to define between them a dovetail groove 21. The strand holder 22, formed of soft rubber material, is fitted snugly in the groove 21, and is embraced by the yoke arms 20, so as to be held against movement relative to the arm 10.

The end arms 9 have yoke arms 23 similar to the arms 20, these embracing end strand holders 24.

Formed in the upper surface of each end strand holder 24 is an end to end longitudinal groove 25. The grooves 25 are preferably disposed in a line with the longitudinal center of the entire device, as seen from Fig. 2.

Formed in the upper surface of the medial strand holder 22 are grooves 26 and 27, that also extend from end to end of the holder. Grooves 26 and 27, however, cross at the center of the holder.

Projections 28 extend from the ends of the medial strand holder 22, for a purpose which will presently appear.

In use, the end arms 9 and medial arm 10 are brought to an upright position, and a strand A is positioned in one of the grooves 25. A strand B is positioned in the groove 25 of the other end strand holder. Strand A is now positioned in groove 27, while strand B is positioned in groove 26.

The free end of strand A is now looped over and under strand B to provide a plurality of loops L. The end E of the strand A is brought back and extended upwardly through the space between the medial strand holder 22 and the closest loop L.

The same operation is now performed with strand B. After the operation has been performed, the ends of the two strands are pulled upwardly, thus releasing the strands from the grooves 26 and 27, and the knot is pulled tight. In this connection, the projections 28 serve to keep open to a sufficient extent the spaces through which the ends are moved upwardly after the loops L have been formed.

The blood knot is thus tied with ease and speed, and it may be noted that better than average eyesight, or special dexterity, is not required.

In Fig. 6, a modified form of the device is illustrated, this being a form of the device which is suited more for bench work, rather than being carried in the pocket. In this instance, the frame is rigidly formed with an elongated base 29 integral with upstanding end arms 30 and a medial arm 31. The strand holders are the same as in the device illustrated in Fig. 1.

In Fig. 7, a modified form of strand holder has been illustrated. In the figure, the center strand holder is shown, but the construction can be applied as well to the end strand holders. In this form, the strand holder instead of being made of a resilient rubber material throughout, is made with a body portion 32 of a hard material such as plastic or the like. This in the present instance is formed with transverse spaced grooves 33, in which are mounted resilient inserts 34. The strand holder in the form of Fig. 7, as will be noted, will hold the strands tightly, due to the resilient inserts.

It may be noted in the bench model illustrated in Fig. 6, that the base may be formed with an opening 35, adapted to receive a rod 36, on which the base may swivel. Rod 36 can be suitably secured to a bench or lap rest (not shown) or to any other suitable supporting surface.

What is claimed is:

1. A strand vise including a pair of end strand holders, said holders each having a longitudinal groove in its upper surface, a medial strand holder interposed therebetween and having crossing grooves, and a supporting frame for all the strand holders.

2. A strand vise including a pair of end strand holders each having a longitudinal groove in its upper surface, a medial strand holder having a pair of crossing grooves formed in its upper surface, all of said holders being adapted to releasably retain strands to be knotted in the grooves, and a supporting frame for all the holders, said frame including a base, and arms upstanding from the base, said arms each adapted to support a strand holder.

3. A strand vise including a horizontally extending base, a pair of end arms extending upwardly from opposite ends of the base, a medial arm extending upwardly from the middle of the base, strand holders respectively secured to the upper ends of the end arms and medial arm and aligned longitudinally of the vise, the strand holders secured to the end arms each having a single strand-receiving groove disposed longitudinally of the vise, and the strand holder secured to the medial arm having a pair of crossed strand-receiving grooves.

4. A strand vise including a horizontally extending base, end arms extending upwardly from the opposite ends of the base, a medial arm extending upwardly from the middle portion of the base, yokes formed on the upper ends of the respective arms, and strand holders gripped in the respective yokes, said strand holders being formed at least partially of resilient material, the strand holders gripped in the yokes of the end arms each having a single strand-receiving groove in line with the longitudinal center line of the vise, the strand holder gripped in the yoke of the medial arm having a pair of crossed grooves, all of said strand holders being aligned longitudinally of the vise.

5. A strand vise as in claim 4, and wherein the strand holder gripped by the yoke of the medial arm has projections extending from its opposite end walls and disposed between the ends of the crossed grooves, said projections extending outwardly from the ends of said medial strand holder thus to constitute spacers intervening between the end surfaces of said medial strand holder and strand portions extending from the ends of the crossed grooves.

LAWRENCE DAVID ROBERTS.

REFERENCES CITED

The following references are of record in the file of this patent:

UNITED STATES PATENTS

| Number | Name | Date |
|---|---|---|
| 876,573 | Myers | Jan. 14, 1908 |
| 1,452,906 | Butler et al. | Apr. 24, 1923 |
| 2,371,920 | Trevisan | Mar. 20, 1945 |